United States Patent
Tsunogae et al.

(10) Patent No.: US 8,889,786 B2
(45) Date of Patent: Nov. 18, 2014

(54) CYCLOPENTENE RING-OPENING POLYMER AND METHOD OF PRODUCTION OF SAME

(75) Inventors: Yasuo Tsunogae, Tokyo (JP); Shigetaka Hayano, Tokyo (JP); Takeshi Sugimura, Tokyo (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 13/877,124

(22) PCT Filed: Sep. 30, 2011

(86) PCT No.: PCT/JP2011/072580
§ 371 (c)(1),
(2), (4) Date: Jun. 5, 2013

(87) PCT Pub. No.: WO2012/043802
PCT Pub. Date: Apr. 5, 2012

(65) Prior Publication Data
US 2013/0281615 A1    Oct. 24, 2013

(30) Foreign Application Priority Data
Sep. 30, 2010    (JP) ................................ 2010-222616

(51) Int. Cl.
| C08L 83/00 | (2006.01) |
| B22F 1/00  | (2006.01) |
| C08L 75/04 | (2006.01) |
| B60C 1/00  | (2006.01) |
| C08G 61/08 | (2006.01) |
| C08G 18/38 | (2006.01) |

(52) U.S. Cl.
CPC ............. *C08G 18/3893* (2013.01); *C08L 75/04* (2013.01); *C08G 2261/3321* (2013.01); *B60C 1/00* (2013.01); *C08G 2261/76* (2013.01); *C08G 61/08* (2013.01); *C08G 2261/135* (2013.01); *C08G 2261/418* (2013.01)
USPC ............................................. 524/588; 524/1

(58) Field of Classification Search
CPC ...... B60C 1/00; C08G 61/08; C08G 18/3893; C08G 2261/135; C08G 2261/418; C08G 2261/76; C08G 2261/3321; C08L 75/04
USPC ....................................................... 524/588, 1
See application file for complete search history.

(56) References Cited

U.S. PATENT DOCUMENTS

| 4,137,390 A |   | 1/1979 | Ofstead |
| 4,172,932 A |   | 10/1979 | Ofstead et al. |
| 8,445,584 B2 | * | 5/2013 | Uchida ........................ 524/591 |

FOREIGN PATENT DOCUMENTS

| JP | 48-066698 A  |   | 9/1973 |
| JP | 48-066699 A  |   | 9/1973 |
| JP | 54-050598 A  |   | 4/1979 |
| JP | 2010-037362  | * | 2/2010 |
| JP | 2010-037362 A |  | 2/2010 |
| JP | 2010-150383 A |  | 7/2010 |
| JP | 2011-122117 A |  | 6/2011 |
| JP | 2011-126966 A |  | 6/2011 |

OTHER PUBLICATIONS

Tsunokai et al, JP 2010-037362 Machine Translation.*
International Search Report of PCT/JP2011/072580, mailing date Jan. 17, 2012.

* cited by examiner

*Primary Examiner* — Ling Choi
*Assistant Examiner* — Jessica E Whiteley
(74) *Attorney, Agent, or Firm* — Westerman, Hattori, Daniels & Adrian, LLP

(57) ABSTRACT

A cyclopentene ring-opening polymer which has hydroxy groups at the polymer chain terminal ends is produced, then the hydroxy groups of the cyclopentene ring-opening polymer and isocyanate groups of a compound containing alkoxysilyl groups and isocyanate groups in its molecule are made to react to thereby produce a cyclopentene ring-opening polymer which contains structures at the polymer chain terminal ends where the polymer chains and groups including alkoxysilyl groups are bonded through urethane bond groups and which has a weight average molecular weight of 100,000 to 1,000,000.

9 Claims, No Drawings

CYCLOPENTENE RING-OPENING POLYMER AND METHOD OF PRODUCTION OF SAME

TECHNICAL FIELD

The present invention relates to a cyclopentene ring-opening polymer and a method of production of the same, more particularly relates to a cyclopentene ring-opening polymer which is high in affinity with carbon black, silica, and other inorganic particles and thereby can give a polymer composition having excellent low heat generation property which is suitable as a material for a low fuel consumption tire, and to a method of production of the same.

BACKGROUND ART

A cyclopentene ring-opening polymer which is obtained by metathesis ring-opening polymerization of cyclopentene is widely known as a rubber material and is used as a rubber material which is blended with carbon black, silica, and other inorganic particles. In general, a cyclopentene ring-opening polymer, for example, as disclosed in Patent Document 1, is produced using a so-called Ziegler-Natta catalyst, which is comprised of $WCl_6$, $MoCl_5$, or other transition metal compound of Group VI of the Periodic Table and an aluminum compound, tin compound, or other organometallic compound, by bulk polymerization or solution polymerization. In some cases, a molecular weight adjuster constituted by a-olefin is added. The thus obtained cyclopentene ring-opening polymer is comprised of only carbon atoms and hydrogen atoms, so the affinity with carbon black, silica, and other inorganic particles is low. For this reason, even if blending inorganic particles into such a cyclopentene ring-opening polymer to form a composition, the effect of inorganic particles in improving the mechanical properties cannot be sufficiently exhibited.

As a technique for improving the affinity of a cyclopentene ring-opening polymer with inorganic particles, in Patent Document 2, a method is proposed of using a ruthenium-carbene complex as a catalyst in the presence of a compound which has functional groups and ethylenically unsaturated bonds (for example, allyltrimethoxysilane etc.) so as to polymerize cyclopentene by ring-opening polymerization and use the metathesis reaction between the polymer chain terminal ends of cyclopentene ring-opening polymer and the ethylenically unsaturated bonds to introduce functional groups to the terminal ends of the cyclopentene ring-opening polymer. The cyclopentene ring-opening polymer which has functional groups at the terminal ends which is obtained by this method is greatly improved in affinity with inorganic particles compared with one which does not have functional groups.

However, if considering the rising demand for low fuel consumption performance from tires in recent years, when using a cyclopentene ring-opening polymer as a composition for tire applications, even the cyclopentene ring-opening polymer which is obtained by the method which is described in Patent Document 2 will hopefully be improved in low heat generation property. For example, even if introducing an alkoxysilyl group, which is considered to have excellent performance as a functional group which is introduced for improving the affinity with inorganic particles for styrene-butadiene rubber etc. which are being broadly used currently for tire applications, into the cyclopentene ring-opening polymer by the method of Patent Document 2, there is still room for improvement of the low heat generation property in the thus obtained polymer composition.

PRIOR ART DOCUMENTS

Patent Documents

Patent Document 1: Japanese Patent Publication No. 54-50598
Patent Document 2: Japanese Patent Publication No. 2010-37362

DISCLOSURE OF THE INVENTION

Problem to be Solved by the Invention

An object of the present invention is to provide a cyclopentene ring-opening polymer which is improved in affinity with inorganic particles and can give a polymer composition which has an excellent low heat generation property and further to provide a method of production of a cyclopentene ring-opening polymer which enables efficient production of such a cyclopentene ring-opening polymer.

Means for Solving the Problems

The inventors engaged in in-depth research to achieve the above object and as a result discovered that a cyclopentene ring-opening polymer which is obtained by causing a reaction between a cyclopentene ring-opening polymer which has hydroxy groups at the polymer chain terminal ends and a compound which contains alkoxysilyl groups and isocyanate groups in its molecule is superior in affinity with inorganic particles compared with a conventional cyclopentene ring-opening polymer and that a polymer composition which is obtained using this has an excellent low heat generation property. The present invention was completed based on this discovery.

Accordingly, according to the present invention, there is provided a cyclopentene ring-opening polymer which has structures at the polymer chain terminal ends where the polymer chains and groups including alkoxysilyl groups are bonded through urethane bond groups and which has a weight average molecular weight of 100,000 to 1,000,000.

Further, according to the present invention, there is provided a method of production of the above cyclopentene ring-opening polymer, comprising steps of producing a cyclopentene ring-opening polymer which has hydroxy groups at the polymer chain terminal ends, then reacting the hydroxy groups of the cyclopentene ring-opening polymer and isocyanate groups of a compound which contains alkoxysilyl groups and isocyanate groups in the molecule. Furthermore, according to the present invention, there is provided a polymer composition which contains the above cyclopentene ring-opening polymer and inorganic particles.

Effects of the Invention

According to the present invention, a cyclopentene ring-opening polymer which is improved in affinity with inorganic particles and can give a polymer composition which has an excellent low heat generation property is provided. Further, a method of production of a cyclopentene ring-opening polymer which enables efficient production of such a cyclopentene ring-opening polymer is provided.

DESCRIPTION OF EMBODIMENTS

The cyclopentene ring-opening polymer of the present invention is a cyclopentene ring-opening polymer which has structures at the polymer chain terminal ends where the polymer chains and groups including alkoxysilyl groups are bonded through urethane bond groups and which has a weight average molecular weight of 100,000 to 1,000,000.

The cyclopentene ring-opening polymer of the present invention has structures where terminal ends of polymer chains, which are comprised of repeating units obtained by ring-opening polymerization of cyclopentene, and groups including alkoxysilyl groups are bonded through urethane bond groups (below, sometimes referred to as the "specific terminal end structures"). The groups including alkoxysilyl groups which form the specific terminal end structures in the cyclopentene ring-opening polymer of the present invention are not particularly limited so long as being groups including at least one alkoxysilyl group.

The alkoxysilyl groups may be any of monoalkoxysilyl groups, dialkoxysilyl groups, or trialkoxysilyl groups. Further, in the alkoxysilyl groups, the alkoxy groups which bond with silicon atoms are also not particularly limited, but are usually $C_1$ to $C_{20}$ alkoxy groups, preferably $C_1$ to $C_{10}$ alkoxy groups. When the alkoxysilyl groups are monoalkoxysilyl groups or dialkoxysilyl groups, the groups which bond with silicon atoms other than alkoxy groups are not particularly limited. For example, hydrogen atoms, $C_1$ to $C_{20}$ alkyl groups, $C_6$ to $C_{20}$ aryl groups, $C_6$ to $C_{20}$ allyloxy groups, halogen atoms, etc. may be mentioned.

As specific examples of the alkoxysilyl groups, a trimethoxysilyl group, triethoxysilyl group, or other trialkoxysilyl group, dimethoxymethylsilyl group, diethoxymethylsilyl group, diethoxymethylsilyl group, diethoxyethylsilyl group, or other dialkoxyalkylsilyl group, and a methoxydimethylsilyl group, ethoxydimethylsilyl group, ethoxydimethylsilyl group, ethoxydiethylsilyl group, or other monoalkoxydialkylsilyl group may be mentioned, but the invention is not limited to these.

The groups including alkoxysilyl groups which form the specific terminal end structures may be alkoxysilyl groups themselves or may further contain bivalent or higher bond groups which bond alkoxysilyl groups and urethane bond groups, but from the viewpoint of facilitating the production of the polymer, ones which contain a bivalent or more bond groups are preferred. The bivalent or higher bond groups are not particularly limited so long as they can bond alkoxysilyl groups and urethane bond groups, but $C_1$ to C20 bivalent or higher hydrocarbon groups are preferable, and $C_1$ to $C_{10}$ bivalent hydrocarbon groups are more preferable.

As specific examples of the groups including alkoxysilyl groups, a 2-(trimethoxysilyl)ethyl group, 3-(trimethoxysilyl)propyl group, 4-(trimethoxysilyl)butyl group, 6-(trimethoxysilyl)hexyl group, 8-(trimethoxysilyl)octyl group, 2-(triethoxysilyl)ethyl group, 3-(triethoxysilyl)propyl group, 4-(triethoxysilyl)butyl group, 6-(triethoxysilyl)hexyl group, 8-(triethoxysilyl)octyl group, 2-(dimethoxymethylsilyl)ethyl group, 3-(dimethoxymethylsilyl)propyl group, 4-(dimethoxymethylsilyl)butyl group, 2-(diethoxymethylsilyl)ethyl group, 3-(diethoxymethylsilyl)propyl group, 4-(diethoxymethylsilyl)butyl group, 2-(dimethoxyethylsilyl)ethyl group, 2-(diethoxyethylsilyl)ethyl group, 2-(diethylmethoxysilyl)ethyl group, and 2-(dimethylethoxysilyl)ethyl group may be mentioned, but the invention is not limited to these.

Further, the structures of the polymer chains and the groups including alkoxysilyl groups bonded through urethane bond groups in the cyclopentene ring-opening polymer of the present invention may be ones in which the nitrogen atoms in the urethane bond groups bond with the polymer chains or may be ones in which the nitrogen atoms in the urethane bond groups bond with groups including alkoxysilyl groups, but from the viewpoint of facilitating the production of the polymer, ones in which the nitrogen atoms in the urethane bond groups bond with the groups including the alkoxysilyl groups is preferable. As such structures, the particularly preferably used structures may be expressed by the following general formula (1).

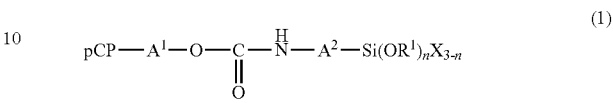

(1)

(in the general formula (1), pCP indicates a polymer chain of cyclopentene ring-opening polymer, and $A^1$ and $A^2$ respectively indicate a single bond or $C_1$ to $C_{20}$ bivalent hydrocarbon group. $R^1$ indicates a $C_1$ to $C_{20}$ alkyl group. When there is a plurality of groups represented by $R^1$, these may be the same groups or may be different groups. X indicates a group selected from a hydrogen atom, $C_1$ to $C_{20}$ alkyl group, $C_6$ to $C_{20}$ aryl group, $C_6$ to $C_{20}$ allyloxy group, and a halogen atom. When there is a plurality of groups represented by X, these may be the same groups or may be different groups. n is an integer of 1 to 3.)

The cyclopentene ring-opening polymer of the present invention may be one in which the specific terminal end structures are introduced at only single polymer chain terminal ends (single terminal ends), may be one in which the specific terminal end structures are introduced at both polymer chain terminal ends (both terminal ends), and, further, may be a mixture of these. Furthermore, these may be mixed with ring-opening polymers of cyclopentene in which specific terminal end structures are not introduced.

In the cyclopentene ring-opening polymer of the present invention, the rate of introduction of the specific terminal end structures to the polymer chain terminal ends is not particularly limited, but from the viewpoint of particularly improving the affinity between the cyclopentene ring-opening polymer and inorganic particles, a value of the percentage of (number of cyclopentene ring-opening polymer chain terminal ends to which specific terminal end structures are introduced/total number of cyclopentene ring-opening polymer chain terminal ends) of 20% or more is preferable, 25% or more is more preferable, and 30% or more is furthermore preferable. Note that, in the cyclopentene ring-opening polymer of the present invention, the rate of introduction of the specific terminal end structures to the polymer chain terminal ends may be found by $^1$H-NMR spectroscopy and gel permeation chromatography (GPC). Specifically, it may be found by comparing the integrated value of peaks derived from protons of carbon-carbon double bonds present in the main chain of the cyclopentene ring-opening polymer by $^1$H-NMR spectroscopy and integrated value of peaks derived from the specific terminal end structures and the number average molecular weight (Mn) by GPC.

The cyclopentene ring-opening polymer of the present invention may be one where the repeating units which form the main chain are comprised of only repeating units obtained by ring-opening polymerization of cyclopentene or may contain repeating units which are derived from other monomers which can copolymerize with cyclopentene. However, from the viewpoint of improving the properties of the cyclopentene ring-opening polymer, the ratio of the repeating units which are derived from other monomers is preferably 20 mol % or less with respect to the total repeating units, more preferably 15 mol % or less, furthermore preferably 10 mol % or less. As the other monomer which can copolymerize with cyclopentene, a monocyclic olefin other than cyclopentene, a monocyclic diene, a monocyclic triene or a polycyclic olefin, polycyclic diene, polycyclic triene, etc. may be mentioned. As the monocyclic olefin other than cyclopentene, a cyclopentene which has substituents or a cyclooctene or cyclooctadiene which may have substituents may be illustrated. As the monocyclic diene, 1,5-cyclooctadiene which may have substituents may be illustrated. As a monocyclic triene, 1,5,9-cyclododecatriene which may have substituents may be illustrated. Further, as a polycyclic cyclic olefin, a norbornene compound which may have substituents may be illustrated.

The cyclopentene ring-opening polymer of the present invention has a molecular weight of a value of the weight average molecular weight (Mw) of 100,000 to 1,000,000, preferably 150,000 to 900,000, more preferably 200,000 to 800,000. By the cyclopentene ring-opening polymer having such a molecular weight, it becomes possible to give a polymer composition which has more excellent mechanical properties.

Further, the ratio (Mw/Mn) of the polystyrene conversion number average molecular weight (Mn) and the polystyrene conversion weight average molecular weight (Mw) measured by gel permeation chromatography in the cyclopentene ring-opening polymer of the present invention is not particularly limited, but usually is 4.0 or less, preferably 3.5 or less, more preferably 3.0 or less. By having such an Mw/Mn, it becomes possible to give a polymer composition which has more excellent mechanical properties.

Note that, in the present invention, the molecular weight of the polymer is made one measured by gel permeation chromatography as a value converted to polystyrene.

At the double bonds present in the repeating units which form the cyclopentene ring-opening polymer of the present invention, the cis/trans ratio is not particularly limited, but is usually selected as 10/90 to 90/10 in range, but from the viewpoint of obtaining a cyclopentene ring-opening polymer which can give a polymer composition which exhibits excellent properties at a low temperature, 30/70 to 90/10 in range is preferable.

The method of producing the above such cyclopentene ring-opening polymer of the present invention is not particularly limited, but the preferably used method of production is the method of production of a cyclopentene ring-opening polymer of the present invention which will be explained later.

The method of production of the cyclopentene ring-opening polymer of the present invention is comprised of producing a cyclopentene ring-opening polymer which has hydroxy groups at the polymer chain terminal ends, then causing a reaction between the hydroxy groups of the cyclopentene ring-opening polymer and the isocyanate groups of a compound containing alkoxysilyl groups and isocyanate groups in its molecule.

In the method of production of the cyclopentene ring-opening polymer of the present invention, first, a cyclopentene ring-opening polymer which has hydroxy groups at the polymer chain terminal ends is produced. The cyclopentene ring-opening polymer which has hydroxy groups at the polymer chain terminal ends may be produced by a known technique. The technique is not particularly limited, but (I) the method of using a ring-opening polymerization catalyst which has resistance to hydroxy groups to polymerize cyclopentene by ring-opening polymerization in the presence of an olefin compound which has hydroxy groups or (II) the method of using a ring-opening polymerization catalyst which does not have resistance to hydroxy groups to polymerize cyclopentene by ring-opening polymerization in the presence of an olefin compound which has hydroxy groups which are protected by protective groups and then removing the protection from the hydroxy groups which were protected by protective groups introduced to terminal ends of the obtained polymer is suitable.

In the method of using a ring-opening polymerization catalyst which has resistance to hydroxy groups to polymerize cyclopentene by ring-opening polymerization in the presence of the olefin compound which has hydroxy groups, the olefin compound which has hydroxy groups which can be used is not particularly limited so long as a compound which contains at least one of an ethylenically unsaturated bond and hydroxy group each in its molecule.

As specific examples of the olefin compound which has hydroxy groups, allylalcohol, 3-buten-1-ol, 4-penten-1-ol, 4-hexen-1-ol, 4-hepten-1-ol, 5-decen-1-ol, 5-hexen-1-ol, 5-octen-1-ol, 6-hepten-1-ol, 4-hydroxystyrene, 2-allylphenol, allyl 4-hydroxybenzoate, 1-cyclohexyl-2-buten-1-ol, ethyleneglycol monoallylether, 3-allyloxy-1,2-propanediol, or other terminal end olefin compound which contains hydroxy groups, 2-butene-1,4-diol, 3-hexene-2,5-diol, or other internal olefin compound which has hydroxy groups at both sides of a carbon-carbon double bond may be mentioned. Note that, the olefin compound which has hydroxy groups may be used as one type alone or may be used as two or more types combined. As the olefin compound which has hydroxy groups, when using a terminal end olefin compound which has hydroxy groups, hydroxy groups are introduced to only single polymer chain terminal ends (single terminal ends), while when using an internal olefin compound which contains hydroxy groups at both sides of the carbon-carbon double bond, hydroxy groups are introduced to both polymer chain terminal ends (both terminal ends).

The olefin compound which has hydroxy groups acts as a chain transfer agent in a ring-opening polymerization reaction system which uses a ring-opening polymerization catalyst having resistance to hydroxy groups and can perform a function as a molecular weight adjuster. Therefore, the amount used of the olefin compound which has hydroxy groups may be determined in accordance with the molecular weight of the targeted cyclopentene ring-opening polymer. The amount used of the olefin compound which has hydroxy groups is not particularly limited, but is usually selected as 0.00001 to 0.01 mole in range per 1 mole of the monomer which is used in the polymerization reaction, preferably 0.00005 to 0.005 mole in range.

Further, as the ring-opening polymerization catalyst which has resistance to hydroxy groups which can be used in the method of ring-opening polymerization of cyclopentene in the presence of an olefin compound which has hydroxy groups, a ruthenium-carbene complex may be mentioned.

The ruthenium-carbene complex is not particularly limited so long as becoming a ring-opening polymerization catalyst of cyclopentene. As specific examples of preferably used ruthenium-carbene complexes, bis(tricyclohexylphosphine) benzylidene ruthenium dichloride, bis(triphenylphosphine)-3,3-diphenylpropenylidene ruthenium dichloride, bis(tricyclohexylphosphine)t-butylvinylidene ruthenium dichloride, bis(1,3-diisopropylimidazolin-2-ylidene)benzylidene ruthenium dichloride, bis(1,3-dicyclohexylimidazolin-2-ylidene) benzylidene ruthenium dichloride, (1,3-dimesitylimidazolin-2-ylidene)(tricyclohexylphosphine) benzylidene ruthenium dichloride, (1,3-dimesitylimidazolidin-2-ylidene)(tricyclohexylphosphine)benzylidene ruthenium dichloride, bis(tricyclohexyl phosphine)ethoxymethylidene ruthenium dichloride, and (1,3-dimesitylimidazolidin-2-ylidene) (tricyclohexylphosphine) ethoxymethylidene ruthenium dichloride may be mentioned.

The amount of the ruthenium-carbene complex used is not particularly limited, but the molar ratio of (metal ruthenium in catalyst:monomer) is usually 1:2,000 to 1:2,000,000, preferably 1:5,000 to 1:1,500,000, more preferably 1:10,000 to 1:1,000,000 in range. If the amount used is too small, sometimes the polymerization reaction does not sufficiently proceed. On the other hand, if too great, it becomes difficult to remove the catalyst residue from the obtained cyclopentene ring-opening polymer.

The polymerization reaction may be performed without a solvent or may be performed in a solution. When performing the polymerization in a solution, the solvent which is used is not particularly limited so long as it is a solvent which is inert in the polymerization reaction and which can dissolve the cyclopentene or polymerization catalyst etc. which are used for the polymerization, but a hydrocarbon-based solvent or a halogen-based solvent is preferably used. As the hydrocarbon-based solvent, for example, benzene, toluene, xylene, ethylbenzene, or other aromatic hydrocarbon, n-hexane, n-heptane, n-octane, and other aliphatic hydrocarbons, cyclohexane, cyclopentane, methylcyclohexane, and other alicyclic hydrocarbons may be mentioned. Further, as the halogen-based solvent, for example, dichloromethane, chloroform, and other alkylhalogens and chlorobenzene, dichlorobenzene, and other aromatic halogens may be mentioned.

The polymerization temperature is not particularly limited, but usually is set to −50 to 100° C. in range. Further, the polymerization reaction time is preferably 1 minute to 72 hours, more preferably 5 hours to 20 hours. After the polymerization conversion rate reaches a predetermined value, it is possible to add a known polymerization terminator to the polymerization system so as to make the polymerization reaction stop.

By doing the above, it is possible to obtain a polymer solution which contains a cyclopentene ring-opening polymer which has hydroxy groups at the polymer chain terminal ends. The cyclopentene ring-opening polymer which has hydroxy groups at the polymer chain terminal ends may be recovered from the polymer solution, then used for a reaction with the isocyanate compound (compound which contains alkoxysilyl groups and isocyanate groups in the molecule) or the polymer solution may be used as is for the reaction with the isocyanate compound. When recovering the polymer from the polymer solution, a known recovery method may be employed. For example, the method of using steam stripping etc. to separate the solvent, then obtaining the solid by filtration and furthermore drying it to obtain a solid rubber etc. can be employed.

Note that, a cyclopentene ring-opening polymer which is obtained by using a ruthenium-carbene complex tends to easily rise in ratio of trans structures at the double bonds which are present in the repeating units. For this reason, sometimes it may have crystallinity at a relatively low temperature, so it may be inferior in properties as a rubber material. From the viewpoint of preventing this, it is preferable to make another monomer copolymerize with the cyclopentene. As specific examples of the other monomer which can be copolymerized with the cyclopentene which can be used in this case, cyclooctene, 1,5-cyclooctadiene, and 1,5,9-cyclododecatriene may be mentioned.

When using a ring-opening polymerization catalyst which does not have resistance to hydroxy groups to polymerize cyclopentene by ring-opening polymerization, the polymerization reaction is performed in the presence of an olefin compound which has hydroxy groups which are protected by protective groups. The protection need only extend to the olefin compound which has the hydroxy groups. Further, the hydroxy groups may be protected using protective groups which are known as protective groups of hydroxy groups. As specific examples of the protective groups of the hydroxy groups, an alkyl group, acyl group, RC(O)— group (where, R indicates a $C_1$ to $C_{10}$ saturated hydrocarbon group), silyl group, or metal alkoxide may be mentioned. Further, the olefin compound may also be made an olefin compound which has hydroxy groups which are protected by reacting an olefin compound which has hydroxy groups and a trialkyl aluminum compound. Note that, when using the reaction product between the olefin compound which has hydroxy groups and the trialkyl aluminum compound, this reaction product can function as the organometallic compound which is used as the later explained catalytic promoter.

The olefin compound which has protected hydroxy groups acts as a chain transfer agent in the ring-opening polymerization reaction system and can perform a function as a molecular weight adjuster. Therefore, the amount of use of the olefin compound which has the protected hydroxy groups may be determined in accordance with the molecular weight of the target cyclopentene ring-opening polymer. The amount of use of the olefin compound which has the protected hydroxy groups is not particularly limited, but is usually selected as 0.00001 to 0.01 mol in range per 1 mole of the monomer which is used for the polymerization reaction, preferably is selected as 0.00005 to 0.005 mol in range.

The ring-opening polymerization catalyst which is used when performing the polymerization reaction in the presence of an olefin compound which has hydroxy groups protected by protective groups is not limited so long as one able to polymerize cyclopentene by ring-opening polymerization, but as the preferably used ring-opening polymerization catalyst, a molybdenum compound or a tungsten compound may be mentioned. As specific examples of the molybdenum compound which can be used as a ring-opening polymerization catalyst, molybdenum pentachloride, molybdenum oxotetrachloride, and molybdenum (phenylimide)tetrachloride may be mentioned, while as specific examples of the tungsten compound, tungsten hexachloride, tungsten oxotetrachloride, tungsten(phenylimide) tetrachloride, monocatecholate tungsten tetrachloride, bis(3,5-ditertiary butyl)catecholate tungsten dichloride, bis(2-chloroethelate) tetrachloride, and tungsten oxotetraphenolate may be mentioned.

When using a molybdenum compound or a tungsten compound as a ring-opening polymerization catalyst, as a catalytic promoter, it is possible to use a combination of organometallic compounds. As the organometallic compounds which can be used as this catalytic promoter, organometallic compounds of metal atoms of Group I, II, XII, XIII, or XIV of the Periodic Table having $C_1$ to $C_{20}$ hydrocarbon groups may be mentioned. Among these, organolithium compounds, organomagnesium compounds, organozinc compounds, organoaluminum compounds, and organotin compounds are preferably used, organolithium compounds, organotin compounds, and organoaluminum compounds are more preferably used, and organoaluminum is particularly preferably used.

As specific examples of the organolithium compound which can be used as an catalytic promoter, n-butyllithium, methyllithium, phenyllithium, neopentyllithium, and neophyllithium may be mentioned. As specific examples of the organomagnesium compound, butylethylmagnesium, butyloctylmagnesium, dihexylmagnesium, ethylmagnesium chloride, n-butylmagnesium chloride, allylmagnesium bromide, neopentylmagnesium chloride, and neophylmagnesium chloride may be mentioned. As specific examples of the organozinc compound, dimethylzinc, diethylzinc, and diphenylzinc may be mentioned. As specific examples of the organotin compound, tetramethyltin, tetra(n-butyl)tin, and tetraphenyltin may be mentioned. As specific examples of the organoaluminum compound, trimethylaluminum, triethylaluminum, triisobutylaluminum, and other trialkylaluminum, diethylaluminum chloride, ethylaluminum sesquichloride, ethylaluminum dichloride, and other alkylaluminum halides and also compounds of the following general formula (2) may be mentioned.

  (2)

(in the general formula (2), $R^2$ and $R^3$ indicate $C_1$ to $C_{20}$ hydrocarbon groups, and "x" is $0<x<3$.)

As specific examples of the $C_1$ to $C_{20}$ hydrocarbon groups expressed by $R^2$ or $R^3$ in the general formula (2), a methyl group, ethyl group, isopropyl group, n-propyl group, isobutyl group, n-butyl group, t-butyl group, n-hexyl group, cyclohexyl group, or other alkyl group, or a phenyl group, 4-methylphenyl group, 2,6-dimethylphenyl group, 2,6-diisopropylphenyl group, naphthyl group, or other aryl group may be mentioned. Note that, the $C_1$ to $C_{20}$ hydrocarbon groups which are expressed by $R^2$ and $R^3$ may be the same or may be different, but from the viewpoint of increasing the ratio of cis structures at the double bonds present in the repeating units of the cyclopentene ring-opening polymer so as to obtain a cyclopentene ring-opening polymer with excellent properties as a rubber material, at least the hydrocarbon group which is expressed by $R^3$ is preferably an alkyl group in which four or more carbon atoms are successively bonded, particularly preferably is any one of a n-butyl group, 2-methylpentyl group, n-hexyl group, cyclohexyl group, n-octyl group, or n-decyl group.

Further, in the general formula (2), "x" is $0<x<3$, but from the viewpoint of increasing the ratio of cis structures at the double bonds present in the repeating units of the cyclopentene ring-opening polymer so as to obtain a cyclopentene ring-opening polymer with excellent properties as a rubber material, it is preferable to use an organoaluminum compound of the general formula (2) in which "x" is $0.5<x<1.5$ in range as the catalytic promoter.

The polymerization reaction conditions etc. in the case of using a molybdenum compound or a tungsten compound as a ring-opening polymerization catalyst may be suitably set in the range of conditions explained for the case of using a ruthenium-carbene complex.

The cyclopentene ring-opening polymer which has hydroxy groups protected by protective groups at the polymer chain terminal ends obtained above may have the protection removed by a known technique in accordance with the type of the protective groups used. Specifically, removal of protection by heating, removal of protection by hydrolysis or alcoholysis, or other method may be mentioned.

A polymer solution which contains the thus obtained cyclopentene ring-opening polymer which has hydroxy groups at the polymer chain terminal ends can be used in the same way as above for a reaction with an isocyanate compound.

The method of production of the cyclopentene ring-opening polymer of the present invention comprises, for example, producing a cyclopentene ring-opening polymer which has hydroxy groups at the polymer chain terminal ends in the above way, then making the hydroxy groups of the cyclopentene ring-opening polymer and isocyanate groups of a compound containing alkoxysilyl groups and isocyanate groups in its molecule react so as to form urethane bond groups and thereby obtain the cyclopentene ring-opening polymer of the present invention. The compound containing alkoxysilyl groups and isocyanate groups in its molecule which is used in the method of production of the cyclopentene ring-opening polymer of the present invention is not particularly limited so long as a compound which contains at least one alkoxysilyl group and isocyanate group each in its molecule. In the present invention, as the preferably used compound containing alkoxysilyl groups and isocyanate groups in its molecule, a compound of the following general formula (3) may be mentioned.

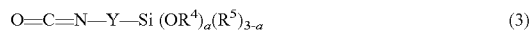  (3)

(in the general formula (3), $R^4$ and $R^5$ indicate $C_1$ to $C_{20}$ hydrocarbon groups, and Y indicate a $C_1$ to $C_{20}$ bivalent hydrocarbon group. "a" is an integer of 1 to 3.)

Among the compounds expressed by the general formula (3) as well, as the particularly preferably used compounds, 2-(trimethoxysilyl)ethylisocyanate, 3-(trimethoxysilyl)propylisocyanate, 4-(trimethoxy-silyl)butylisocyanate, 6-(trimethoxysilyl)hexylisocyanate, 8-(trimethoxysilyl)octylisocyanate, 2-(triethoxysilyl)ethylisocyanate, 3-(triethoxysilyl)propylisocyanate, 4-(triethoxysilyl)butylisocyanate, 6-(triethoxysilyl)hexylisocyanate, 8-(triethoxysilyl)octylisocyanate, 2-(dimethoxymethylsilyl)ethylisocyanate, 3-(dimethoxymethylsilyl)propylisocyanate, 4-(dimethoxymethylsilyl)butylisocyanate, 2-(diethoxymethylsilyl)ethylisocyanate, 3-(diethoxymethylsilyl)propylisocyanate, 4-(diethoxymethylsilyl)butylisocyanate, 2-(dimethoxyethylsilyl)ethylisocyanate, 2-(diethoxyethylsilyl)ethylisocyanate, 2-(diethylmethoxysilyl)ethylisocyanate, and 2-(dimethylethoxysilyl)ethylisocyanate may be mentioned.

The conditions for reacting the hydroxy groups of the cyclopentene ring-opening polymer and the isocyanate groups of the compound containing alkoxysilyl groups and isocyanate groups in its molecule are not particularly limited. For example, this may be performed by mixing these in a solvent or in the absence of a solvent and heating to 20 to 200° C. As the solvent when using a solvent, a solvent similar to the solvent which is used in the polymerization reaction may be used. Further, in accordance with need, it is possible to add a urethane reaction catalyst to the reaction system to perform the reaction. The urethane reaction catalyst which is used is not particularly limited, but, for example, an organotin compound (dibutyltin dilaurate, dioctyltin dilaurate, etc.), bismuth compound, or other metal catalyst, organoamine or other base catalyst, or DMC catalyst may be used.

The reaction ratio of the hydroxy groups of the cyclopentene ring-opening polymer and the isocyanate groups of the compound containing alkoxysilyl groups and isocyanate groups in its molecule may be suitably selected in accordance with the desired rate of introduction of the specific terminal end structures etc. It is not particularly limited, but the molar ratio of the hydroxy groups:isocyanate groups is usually set to 1:1 to 1:200 in range, preferably 1:1 to 1:100 in range.

According to the method of production of the cyclopentene ring-opening polymer of the present invention explained above, it is possible to efficiently produce the cyclopentene ring-opening polymer of the present invention. Note that, the obtained cyclopentene ring-opening polymer may also, as desired, have a phenol-based stabilizer, phosphorus-based stabilizer, sulfur-based stabilizer, or other antiaging agent added to it. The amount of the antiaging agent added may be suitably determined in accordance with the type. Furthermore, as desired, an extender oil may also be blended in.

When obtaining a polymer solution constituted by a cyclopentene ring-opening polymer, to recover the polymer from the polymer solution, a known recovery method may be employed. For example, the method of steam stripping etc. to separate the solvent, then obtaining the solids by filtration and furthermore drying them to obtain solid rubber etc. may be employed.

The polymer composition of the present invention is a polymer composition which contains the cyclopentene ring-opening polymer of the present invention and inorganic particles. The inorganic particles are not particularly limited. They may be freely selected from known inorganic particles, but silica or carbon black is preferably used. From the viewpoint of obtaining a polymer composition which is particularly excellent in the low heat generation property, inorganic particles which contain at least silica are preferably used.

In the polymer composition of the present invention, as specific examples of the silica which can be used as inorganic particles, for example, dry type white carbon, wet type white carbon, colloidal silica, and the precipitated silica which is disclosed in Japanese Patent Publication No. 62-62838 may be mentioned. Among these as well, wet type white carbon which is mainly comprised of hydrous silicic acid is preferable. Further, it is also possible to use a carbon-silica dual phase filler comprised of carbon black on the surface of which silica is carried. These silicas may be used respectively alone or in combinations of two or more types.

The silica has a nitrogen adsorption specific surface area (measured by BET method based on ASTM D3037-81) of preferably 50 to 400 m$^2$/g, more preferably 100 to 220 m$^2$/g. Further, the silica has a pH of preferably less than pH7, more preferably pH5 to 6.9. If in this range, the affinity of the cyclopentene ring-opening polymer and silica becomes particularly good.

The amount of the silica is not particularly limited, but is, with respect to 100 parts by weight of the total polymer ingredients in the polymer composition, preferably 10 to 150 parts by weight, more preferably 20 to 120 parts by weight, particularly preferably 40 to 100 parts by weight.

When using inorganic particles constituted by silica, to improve the adhesion between the cyclopentene ring-opening polymer and the silica, it is preferable to further blend into the polymer composition a silane coupling agent. As the silane coupling agent, for example, vinyltriethoxysilane, β-(3,4-epoxycyclohexyl)ethyltrimethoxysilane, N-(β-aminoethyl)-γ-aminopropyltrimethoxysilane, bis(3-(triethoxysilyl)propyl)tetrasulfide, bis(3-(triethoxysilyl)propyl)disulfide, etc. or γ-trimethoxysilylpropyldimethylthiocarbamyltetrasulfide, γ-trimethoxysilylpropylbenzothiazyltetrasulfide, and other tetrasulfides etc. described in Japanese Patent Publication No. 6-248116 may be mentioned. These silane coupling agents may be respectively used alone or in combinations of two or more types. The amount of the silane coupling agent is, with respect to 100 parts by weight of silica, preferably 0.1 to 30 parts by weight, more preferably 1 to 15 parts by weight.

In the polymer composition of the present invention, as the carbon black which can be used as inorganic particles, for example, furnace black, acetylene black, thermal black, channel black, graphite, etc. may be mentioned. Among these, furnace black is preferable. As specific examples of this, SAF, ISAF, ISAF-HS, ISAF-LS, IISAF-HS, HAF, HAF-HS, HAF-LS, FEF, etc. may be mentioned. These carbon blacks may be respectively used alone or in combinations of two or more types. The amount of the carbon black is, with respect to 100 parts by weight of the polymer composition, usually 150 parts by weight or less. Further, when jointly using silica and carbon black, the total content of the silica and carbon black is preferably, with respect to 100 parts by weight of the total polymer composition, 10 to 150 parts by weight.

The carbon black has a nitrogen adsorption specific surface area (N$_2$SA) of preferably 5 to 200 m$^2$/g, more preferably 80 to 130 m$^2$/g, and has a dibutylphthalate (DBP) adsorption of preferably 5 to 300 ml/100 g, more preferably 80 to 160 ml/100 g.

The polymer composition of the present invention may also contain rubber other than the cyclopentene ring-opening polymer of the present invention. As the rubber other than the polymer of the present invention, for example, natural rubber (NR), polyisoprene rubber (IR), emulsion polymerization SBR (styrene-butadiene copolymer rubber), solution polymerization random SBR (bound styrene 5 to 50 wt %, 1,2-bond content of butadiene part 10 to 80%), high trans SBR (trans bond content of butadiene part: 70 to 95%), low cis BR (polybutadiene rubber), high cis BR, high trans BR (trans bond content of butadiene part: 70 to 95%), styrene-isoprene copolymer rubber, butadiene-isoprene copolymer rubber, emulsion polymerization styrene-acrylonitrile-butadiene copolymer rubber, acrylonitrile-butadiene copolymer rubber, high vinyl SBR-low vinyl SBR block copolymer rubber, polyisoprene-SBR block copolymer rubber, polystyrene-polybutadiene-polystyrene block copolymer, acrylic rubber, epichlorohydrin rubber, fluororubber, silicone rubber, ethylene-propylene rubber, urethane rubber, etc. may be mentioned. Among these, NR, BR, IR, SBR are preferably used. These rubbers may be respectively used alone or in combinations of two or more types.

When the polymer composition of the present invention contains rubber other than the cyclopentene ring-opening polymer of the present invention, the ratio of the cyclopentene ring-opening polymer is, with respect to the total amount of the polymer ingredients, preferably 10 wt % or more, more preferably 20 to 90 wt % in range, particularly preferably 30 to 80 wt % in range. If this ratio is too low, the properties of the polymer composition are liable to be inferior.

The polymer composition of the present invention may have blended into it, in addition to the above ingredients, by ordinary methods additives other than the above ingredients such as a cross-linking agent, cross-linking accelerator, cross-linking activant, antiaging agent, activant, process oil, plasticizer, slip agent, filler, etc. in accordance with need.

As the cross-linking agent, powdered sulfur, precipitated sulfur, colloidal sulfur, insoluble sulfur, high dispersion sulfur, and other sulfur; sulfur monochloride, sulfur dichloride, and other halogenated sulfur; dicumyl peroxide, di-tertiary-butyl peroxide, and other organic peroxides; p-quinone dioxime, p,p'-dibenzoyl quinine dioxime, and other quinine dioximes; triethylenetetramine, hexamethylenediamine carbamate, 4,4'-methylenebis-o-chloroaniline, or other organic polyvalent amine compounds; an alkyl phenol resin which has a methylol group, etc. may be mentioned. Among these, sulfur is preferable, while powdered sulfur is more preferable. These cross-linking agents are used respectively alone or in two or more types combined. The amount of the cross-linking agent is, with respect to 100 parts by weight of the total polymer ingredients, preferably 0.1 to 15 parts by weight, more preferably 0.5 to 5 parts by weight.

As the cross-linking accelerator, for example, N-cyclohexyl-2-benzothiazylsulfenamide, N-t-butyl-2-benzothiazolesulfenamide, N-oxyethylene-2-benzothiazolesulfenamide, N-oxyethylene-2-benzothiazolesulfenamide, N,N'-diisopropyl-2-benzothiazolesulfenamide, and other sulfenamide-based cross-linking accelerators; diphenylguanidine, di-ortho-tolylguanidine, ortho-tolylbiguanidine, and other guanidine-based cross-linking accelerators;

diethylthiourea and other thiourea-based cross-linking accelerators; 2-mercaptobenzothiazole, dibenzothiazyldisulfide, 2-mercaptobenzothiazole zinc salt, and other thiazole-based cross-linking accelerators; tetramethylthiuram monosulfide, tetramethylthiuram disulfide, and other thiuram-based cross-linking accelerators; sodium dimethyldithiocarbamate, zinc diethyldithiocarbamate, and other dithiocarbamic acid-based cross-linking accelerators; sodium isopropylxanthogenate, zinc isopropylxanthogenate, zinc butylxanthogenate, and other xanthogenic acid-based cross-linking accelerators; and other cross-linking accelerators may be mentioned. Among these, a compound including sulfonamide-based cross-linking accelerator is particularly preferable. These cross-linking accelerators may be used alone or as two or more types in combination. The amount of the cross-linking accelerator is, with respect to 100 parts by weight of the total polymer ingredients, preferably 0.1 to 15 parts by weight, more preferably 0.5 to 5 parts by weight.

As the cross-linking activator, for example, stearic acid or other higher fatty acid or zinc oxide etc. may be used. As the zinc oxide, one with a high surface activity and of a particle size of 5 μm or less is preferable, for example, active zinc white with a particle size of 0.05 to 0.2 μm, zinc white of 0.3 to 1 μm, etc. may be mentioned. Further, as the zinc oxide, one which is treated at its surface by an amine-based dispersant or wetting agent may also be used. The amount of the cross-linking activator is suitably selected, but the amount of higher fatty acid is, with respect to 100 parts by weight of the total polymer ingredients, preferably 0.05 to 15 parts by weight, more preferably 0.5 to 5 parts by weight, while the amount of zinc oxide is, with respect to 100 parts by weight of the total polymer ingredients, preferably 0.05 to 10 parts by weight, more preferably 0.5 to 3 parts by weight.

As the process oil, mineral oil or synthetic oil may be used. As the mineral oil, aromatic oil, naphthenic oil, paraffin oil, etc. is usually used. As other compounding agents, diethyleneglycol, polyethyleneglycol, silicone oil, and other activants; calcium carbonate, talc, clay, and other fillers; petroleum resin, coumarone resin, and other tackifiers; wax, etc. may be mentioned.

The polymer composition of the present invention can be obtained by kneading the each ingredient by an ordinary method. For example, the compounding agents other than the cross-linking agent and the cross-linking accelerator may be kneaded with the cyclopentene ring-opening polymer or other polymer (rubber), then the cross-linking agent and cross-linking accelerator may be mixed with the kneaded product to obtain a polymer composition. The kneading temperature of the compounding agents other than the cross-linking agent and the cross-linking accelerator with the cyclopentene ring-opening polymer is preferably 80 to 200° C., more preferably 120 to 180° C., while the kneading time is preferably 30 seconds to 30 minutes. The cross-linking agent and cross-linking accelerator are mixed after cooling to usually 100° C. or less, preferably 80° C. or less.

The polymer composition of the present invention is usually used as a cross-linked product. The method of cross-linking the polymer composition is not particularly limited. It may be selected in accordance with the shape, size, etc. of the cross-linked product. A mold may be filled with the polymer composition and heated for cross-linking simultaneously with molding or a preformed polymer composition may be heated for cross-linking. The cross-linking temperature is preferably 120 to 200° C., more preferably 140 to 180° C., while the cross-linking time is usually 1 to 120 minutes or so.

The polymer composition of the present invention is excellent in affinity with inorganic particles, so gives a rubber cross-linked product which is excellent in mechanical properties, low heat generation property, wet grip, and abrasion resistance. Therefore, various applications making use of these characteristics, for example, utilization for treads, carcasses, sidewalls, beads, and other tire locations or utilization for hoses, window frames, belts, shoe soles, rubber vibration dampeners, auto parts, and other rubber products, and, furthermore, utilization as shock resistant polystyrene, ABS resin, and other resin reinforced rubber become possible. Particularly, this is excellent for tire tread use for low fuel consumption tires. In addition, it is suitable as a material for tire treads, sidewalls, undertreads, carcasses, beads, etc. of all season tires, high performance tires, studless tires, etc.

EXAMPLES

Below, the present invention will be explained based on further detailed examples, but the present invention is not limited to these examples. Note that, below, "parts", unless otherwise indicated, are based on weight. Further, the various tests and evaluations were performed by the following methods:

[Molecular Weight]

A gel permeation chromatography (GPC) system HLC-8220 (made by Tosoh) and an H-type column HZ-M (made by Tosoh) were used for measurement at 40° C. while using tetrahydrofuran as a solvent. The polystyrene conversion value was found.

[Cis/Trans Ratio]

This was determined by $^{13}$C-NMR spectroscopy.

[Rate of Introduction of Functional Groups of Cyclopentene Ring-Opening Polymer which has Functional Groups at Polymer Chain Terminal Ends]

$^1$H-NMR spectroscopy was used to find the ratio of the integrated value of peaks derived from various functional groups and the integrated value of peaks derived from the carbon-carbon double bonds in the main chain of the cyclopentene ring-opening polymer. This ratio of peak integrated values and the measurement value of the number average molecular weight (Mn) measured by GPC were used as the basis to calculate the rate of introduction of various types of functional groups [percentage of (number of cyclopentene ring-opening polymer chain terminal ends to which functional groups were introduced/total number of cyclopentene ring-opening polymer chain terminal ends)].

[Rate of Introduction of Specific Terminal End Structures to Cyclopentene Ring-Opening Polymer]

$^1$H-NMR spectroscopy was used to find the ratio of the integrated value of peaks derived from the alkoxysilyl groups and the integrated value of peaks derived from the carbon-carbon double bonds in the main chains of the cyclopentene ring-opening polymer. This ratio of peak integrated values and the measurement value of the number average molecular weight (Mn) measured by GPC were used as the basis to calculate the rate of introduction of the specific terminal end structures [percentage of (number of cyclopentene ring-opening polymer chain terminal ends to which specific terminal end structures were introduced/total number of cyclopentene ring-opening polymer chain terminal ends)]. Note that, in the $^1$H-NMR spectroscopy, the presence of a peak derived from the alkoxysilyl groups appearing near 3.8 ppm and peaks derived from urethane bond groups appearing near 4.5 ppm and 4.9 ppm was confirmed, whereby the introduction of the specific terminal end structures was confirmed.

[Evaluation of Affinity with Inorganic Particles of Cyclopentene Ring-Opening Polymer]

The cyclopentene ring-opening polymer as the sample 1 part was dissolved in decalin 18 parts, then this solution had silica (product name "Zeosil 1165MP", made by Rhodia) 1 part added to it and was stirred at 150° C. for 6 hours. Next, a large excess of isopropanol was added to this solution. The coagulated product which was produced due to this was recovered and vacuum dried at 40° C. for 2 days. Further, the vacuum dried coagulate was placed in a cage and dipped in a large excess of toluene at 23° C. for 3 days so as to make the cyclopentene ring-opening polymer not bonded to silica dissolve. The coagulated product remaining in the cage was washed with toluene, then was dried by a vacuum dryer and was measured for weight after drying. The weight increased from the silica 1 part was found. This increased weight can be said to be a cyclopentene ring-opening polymer bonded to silica. The higher this value, the better the affinity to inorganic particles can be said.

[Evaluation of Low Heat Generation Property of Polymer Composition]

The polymer composition as the sample was cross-linked by pressing at 160° C. for 20 minutes to thereby prepare a cross-linked test piece. This test piece was measured using a viscoelasticity measuring device (product name: "EPLEXOR", made by GABO) for tan δ at 60° C. under conditions of an initial strain of 0.5%, a dynamic strain of 1%, and 10 Hz. This value was indexed to the measured value of the sample of Comparative Example 4 as 100. The smaller this index, the better the low heat generation property can said to be.

Production Example 1

Production 1 of Cyclopentene Ring-Opening Polymer Having Hydroxy Groups at Polymer Chain Terminal Ends Using Ring-Opening Polymerization Catalyst Not Having Resistance to Hydroxy Groups Under a nitrogen atmosphere, a glass container in which a stirrer was placed was charged with toluene 173 parts and a concentration 25.4 wt % triisobutylaluminum/n-hexane solution (made by Tosoh Finechem) 13.8 parts. Next, the container was cooled to −45° C. and, under vigorous stirring, n-butenol 1.27 parts (equimolar amount with respect to triisobutylaluminum) was slowly added dropwise. After that, by allowing this to stand until becoming room temperature while stirring, a reaction production solution of triisobutylaluminum and n-butenol was obtained. Next, under a nitrogen atmosphere, a pressure resistant glass reaction vessel equipped with a stirrer was charged with a concentration 2.0 wt % $WCl_6$/toluene solution 43 parts and the above obtained reaction product solution of triisobutylaluminum and n-butenol 48 parts. This was stirred for 10 minutes. Next, this was charged with ethyl acetate 0.39 part for the purpose of adjusting the cis/trans ratio of the obtained polymer and stirred for 10 minutes. Next, this was charged with cyclopentene 150 parts to cause a polymerization reaction at 25° C. for 6 hours. After the polymerization reaction, an excess of hydrous isopropanol was added to stop the polymerization and further remove the protection from the protected hydroxy groups. The obtained solution was poured into a large excess of isopropanol, whereupon the polymer precipitated. The precipitated polymer was recovered, was washed by isopropanol, then was vacuum dried at 40° C. for 3 days to thereby obtain a cyclopentene ring-opening polymer which has hydroxy groups at the polymer chain terminal ends in 74 parts. The obtained polymer had a weight average molecular weight (Mw) of 278,300 and a molecular weight distribution (Mw/Mn) of 2.50 and had a cis/trans ratio of 60/40. Further, the rate of introduction of hydroxy groups to the polymer chain terminal ends was 34%.

Production Example 2

Production 1 of Cyclopentene Ring-Opening (Co)polymer Having Hydroxy Groups at Polymer Chain Terminal Ends Using Ring-Opening Polymerization Catalyst Having Resistance to Hydroxy Groups Under a nitrogen atmosphere, a pressure resistant glass reaction vessel in which a magnetic stirrer was placed was charged with cyclopentene 100 parts, a monomer copolymerizing with cyclopentene, that is, 1,5,9-cyclododecatriene, 15 parts, and 4-butenol 0.02 part. Next, this was charged with (1,3-dimesitylimidazolidin-2-ylidene)(tricyclohexylphosphine)benzylidene ruthenium dichloride 0.0062 part dissolved in toluene 10 parts to cause a polymerization reaction at 0° C. for 10 hours. After the polymerization reaction, an excess of vinylethylether was added to stop the polymerization, then the obtained solution was poured into a large excess of isopropanol, whereupon the polymer precipitated. The precipitated polymer was recovered, was washed by isopropanol, then was vacuum dried at 40° C. for 3 days to thereby obtain a cyclopentene ring-opening (co)polymer having hydroxy groups at the polymer chain terminal ends in 60 parts. The obtained polymer had a weight average molecular weight (Mw) of 344,700 and a molecular weight distribution (Mw/Mn) of 1.89 and had a cis/trans ratio of 17/83. Further, the rate of introduction of hydroxy groups to the polymer chain terminal ends was 50%.

Production Example 3

Production 2 of Cyclopentene Ring-Opening Polymer Having Hydroxy Groups at Polymer Chain Terminal Ends Using Ring-Opening Polymerization Catalyst Not Having Resistance to Hydroxy Groups Under a nitrogen atmosphere, a glass container in which a stirrer was placed was charged with toluene 173 parts and concentration 25.4 wt % triisobutylaluminum/n-hexane solution (made by Tosoh Finechem) 13.8 parts. Next, the container was cooled to −45° C. and, under vigorous stirring, 2-butene-1,4-diol 0.78 part (½ mol amount with respect to triisobutylaluminum) was slowly added dropwise. After this, by allowing this to stand until becoming room temperature while stirring, a reaction product solution of triisobutylaluminum and 2-butene-1,4-diol was obtained. Next, under a nitrogen atmosphere, a pressure resistant glass reaction vessel equipped with a stirrer was charged with cyclopentene 150 parts and the above obtained reaction product solution of triisobutylaluminum and 2-butene-1,4-diol in 96 parts and, furthermore, was charged with concentration 2.0 wt % $WCl_6$/toluene solution 8.6 parts to cause a polymerization reaction at 25° C. for 6 hours. After the polymerization reaction, an excess of hydrous isopropanol was added to thereby stop the polymerization and further remove the protection of the protected hydroxy groups. The obtained solution was poured into a large excess of isopropanol, whereupon the polymer precipitated. The precipitated polymer was recovered, was washed by isopropanol, then was vacuum dried at 40° C. for 3 days to thereby obtain a cyclopentene ring-opening polymer which has hydroxy groups at the polymer chain terminal ends in 87 parts. The obtained polymer had a weight average molecular weight (Mw) of 328,000 and a molecular weight distribution (Mw/Mn) of 2.34 and had a cis/trans ratio of 55/45. Further, the rate of introduction of hydroxy groups to the polymer chain terminal ends was 89%.

Production Example 4

Production 2 of Cyclopentene Ring-Opening (Co)polymer Having Hydroxy Groups at Polymer Chain Terminal Ends Using Ring-Opening Polymerization Catalyst Having Resistance to Hydroxy Groups Except for using, instead of 4-butenol 0.02 part, 2-butene-1,4-diol 0.018 part, the same procedure was followed as with the Production Example 2 to obtain a cyclopentene ring-opening (co)polymer which has hydroxy groups at the polymer chain terminal ends in 65 parts. The obtained polymer had a weight average molecular weight (Mw) of 283,600 and a molecular weight distribution (Mw/Mn) of 1.90 and had a cis/trans ratio of 18/82. Further, the rate of introduction of hydroxy groups to the polymer chain terminal ends was 91%.

Example 1

Under a nitrogen atmosphere, a pressure resistant glass reaction vessel equipped with a stirrer was charged with the cyclopentene ring-opening polymer which has hydroxy groups at the polymer chain terminal ends which was obtained at Production Example 1 in 70 parts and toluene 630 parts to dissolve the polymer in the toluene. Furthermore, it was charged with 3-(triethoxysilyl)propylisocyanate 11 parts and stirred at 100° C. for 20 hours to cause the hydroxy groups of the polymer chain terminal ends and the isocyanate groups of the 3-(triethoxysilyl)propylisocyanate to react and form urethane bond groups. After the end of the reaction, the solution in the vessel was poured into a large excess of isopropanol containing 2,6-di-t-butyl-p-cresol (BHT), whereupon the polymer precipitated. The precipitated polymer was recovered, was washed by isopropanol, then was vacuum dried at 40° C. for 3 days to thereby obtain a cyclopentene ring-opening polymer which has the specific terminal end structures in 70 parts. The obtained polymer had a weight average molecular weight (Mw) of 334,400 and a molecular weight distribution (Mw/Mn) of 2.53. Further, the rate of introduction of the specific terminal end structures to the polymer chain terminal ends was 35%. Note that, the rate of introduction of the specific terminal end structures became higher than the rate of introduction of hydroxy groups of the cyclopentene ring-opening polymer which was obtained in Production Example 1 as a material probably because the change in the terminal end structures affected the GPC measurement and, as a result of this, the apparent molecular weight changed. In actuality, it is believed that substantially 100% of the hydroxy groups were converted to the specific terminal end structures. Furthermore, part of the obtained polymer was used to evaluate the affinity with inorganic particles.

Further, the obtained cyclopentene ring-opening polymer 50 parts, commercially available styrene butadiene rubber (product name "Nipol SBR1723", bound styrene amount 23.5%, extender oil content 27.3%, made by Zeon Corporation) 55 parts, and commercially available polybutadiene rubber (product name "Nipol BR1220", made by Zeon Corporation) 10 parts were kneaded in a Brabender type mixer for 30 seconds, next, silica (product name "Zeosil 1165MP", made by Rhodia) 50 parts, a silane coupling agent (product name "Si75", bis(3-(triethoxysilyl)propyl)disulfide, made by Degussa) 5.6 parts, and a process oil (product name "Fukkol Aromax#3", made by Fujikosan) 15 parts were added and kneaded at a 80° C. as starting temperature for 1.5 minutes, then, furthermore, silica (product name "Zeosil 1165MP", made by Rhodia) 20 parts, carbon black (product name "Seast 7HM", made by Tokai Carbon) 10 parts, a process oil (product name "Fukkol Aromax#3", made by Fujikosan) 20 parts, zinc oxide 3 parts, stearic acid 2 parts, an antiaging agent (product name "Nocrac 6C", made by Ouchi Shinko Chemical) 2 parts, and paraffin wax 1 part were added and further kneaded for 2.5 minutes, then the kneaded product was discharged from the mixer. The temperature of the kneaded product at the time of the end of kneading was 150° C. The kneaded product was cooled down to room temperature, then was again kneaded in a Brabender type mixer at a 80° C. as starting temperature for 2 minutes, then the kneaded product was discharged from the mixer. Next, using a 50° C. open roll, the obtained kneaded product and sulfur 1.7 parts and crosslinking accelerator (mixture of N-cyclohexyl-2-benzothiazylsulfenamide 1.6 parts and diphenylguanidine 1.5 parts) were kneaded, then a sheet-shaped polymer composition was taken out. This polymer composition was evaluated for low heat generation property. The results of measurement and evaluation in Example 1 are shown summarized in Table 1.

TABLE 1

| | | Cyclopentene open-ring polymer | | | | |
| --- | --- | --- | --- | --- | --- | --- |
| | Polymer chain terminal end structure (functional groups) | Terminal structure (functional group) introduction rate (%) | Weight average molecular weight (Mw) | Molecular weight distribution (Mw/Mn) | Affinity evaluation (amount of bonds to silica (parts/1 part of silica)) | Polymer composition Low heat generation property (index) |
| Example 1 | Groups containing triethoxysilyl groups through urethane bond groups | 35 | 334,400 | 2.53 | 0.35 | 82 |
| Example 2 | Groups containing trimethoxysilyl groups through urethane bond groups | 50 | 387,200 | 1.90 | 0.38 | 79 |
| Example 3 | Groups containing triethoxysilyl groups through urethane bond groups | 84 | 387,700 | 2.05 | 0.40 | 72 |
| Example 4 | Groups containing trimethoxysilyl groups through urethane bond groups | 94 | 351,600 | 1.95 | 0.45 | 69 |
| Comp. Ex. 1 | Hydroxy groups | 34 | 278,300 | 2.50 | 0.12 | 98 |
| Comp. Ex. 2 | Triethoxysilyl groups | 50 | 312,800 | 2.05 | 0.18 | 95 |
| Comp. Ex. 3 | Trimethoxysilyl groups | 50 | 297,000 | 1.98 | 0.22 | 92 |
| Comp. Ex. 4 | No functional groups | — | 291,100 | 2.15 | 0.12 | 100 |
| Comp. Ex. 5 | Hydroxy groups | 89 | 328,000 | 2.34 | 0.14 | 97 |

Example 2

Except for using, instead of the polymer obtained in Production Example 1 in 70 parts, the polymer obtained in Production Example 2 in 70 parts, and except for using, instead of 3-(triethoxysilyl)propylisocyanate 11 parts, 3-(trimethoxysilyl)propylisocyanate 8 parts, the same procedure was followed as in Example 1 to obtain a cyclopentene ring-opening polymer which has the specific terminal end structures in 70 parts. The obtained polymer had a weight average molecular weight (Mw) of 387,200 and a molecular weight distribution (Mw/Mn) of 1.90. Further, the rate of introduction of the specific terminal end structures to the polymer chain terminal ends was 50%. For the obtained cyclopentene ring-opening polymer, the same procedure was followed as in Example 1 to obtain a sheet-shaped polymer composition and to evaluate this polymer composition for low heat generation property. The results of measurement and evaluation in Example 2 are shown summarized in Table 1.

Example 3

Except for using, instead of the polymer obtained in Production Example 1 in 70 parts, the polymer obtained in Production Example 3 in 70 parts and except for changing the amount of use of 3-(triethoxysilyl)propylisocyanate to 23 parts, the same procedure was followed as in Example 1 to obtain a cyclopentene ring-opening polymer which has the specific terminal end structures in 70 parts. The obtained polymer had a weight average molecular weight (Mw) of 387,700 and a molecular weight distribution (Mw/Mn) of 2.05. Further, the rate of introduction of the specific terminal end structures to the polymer chain terminal ends was 84%. For the obtained cyclopentene ring-opening polymer, the same procedure was followed as in Example 1 to obtain a sheet-shaped polymer composition and to evaluate this polymer composition for the low heat generation property. The results of measurement and evaluation in Example 3 are shown summarized in Table 1.

Example 4

Except for using, instead of the polymer obtained in Production Example 2 in 70 parts, the polymer obtained in Production Example 4 in 70 parts and except for changing the amount of use of 3-(trimethoxysilyl)propylisocyanate to 18 parts, the same procedure was followed as in Example 2 to obtain a cyclopentene ring-opening polymer which has the specific terminal end structures in 70 parts. The obtained polymer had a weight average molecular weight (Mw) of 351,600 and a molecular weight distribution (Mw/Mn) of 1.95. Further, the rate of introduction of the specific terminal end structures to the polymer chain terminal ends was 94%. For the obtained cyclopentene ring-opening polymer, the same procedure was followed as in Example 1 to obtain a sheet-shaped polymer composition and to evaluate this polymer composition for the low heat generation property. The results of measurement and evaluation in Example 4 are shown summarized in Table 1.

Comparative Example 1

Part of the cyclopentene ring-opening polymer which has hydroxy groups at the polymer chain terminal ends which was obtained in Production Example 1 was evaluated for affinity with inorganic particles. Furthermore, except that the polymer which was obtained at Production Example 1 was used as is, without introducing the specific terminal end structures to the polymer chain terminal ends, for production of a sheet-shaped polymer composition similar to Example 1 (process after process of kneading with styrene butadiene rubber or polybutadiene rubber), the same procedure was followed as in Example 1 to obtain a sheet-shaped polymer composition and to evaluate this polymer composition for the low heat generation property. The results of measurement and evaluation in Comparative Example 1 are shown summarized in Table 1.

Comparative Example 2

Under a nitrogen atmosphere, a glass container in which a stirrer was placed was charged with a concentration 1.0 wt % $WCl_6$/toluene solution 8.7 parts and a concentration 2.5 wt % diisobutylaluminum mono(n-hexoxide)/toluene solution 4.3 parts. This was stirred for 15 minutes to obtain a catalyst solution. Further, under a nitrogen atmosphere, a pressure resistant glass reaction vessel equipped with a stirrer was charged with cyclopentene 150 parts and allyltriethoxysilane 0.22 part. To this, the above prepared catalyst solution 13 parts was added to perform a polymerization reaction at 25° C. for 6 hours. After the polymerization reaction, an excess of isopropanol was added to stop the polymerization. The obtained solution was poured into a large excess of isopropanol, whereupon the polymer precipitated. The precipitated polymer was recovered, was washed by isopropanol, then was vacuum dried at 40° C. for 3 days to thereby obtain a cyclopentene ring-opening polymer which has alkoxysilyl groups (triethoxysilyl groups) introduced by a metathesis reaction at the polymer chain terminal ends in 76 parts. The obtained polymer had a weight average molecular weight of 312,800 and a molecular weight distribution (Mw/Mn) of 2.05 and had a cis/trans ratio of 60/40. Further, the rate of introduction of alkoxysilyl groups at the polymer chain terminal ends was 50%. Part of the obtained polymer was evaluated for affinity with inorganic particles. Furthermore, except that the obtained polymer was used as is for production of a sheet-shaped polymer composition similar to Example 1 (process after process of kneading with styrene butadiene rubber or polybutadiene rubber), the same procedure was followed as in Example 1 to obtain a sheet-shaped polymer composition and to evaluate this polymer composition for the low heat generation property. The results of measurement and evaluation in Comparative Example 2 are shown summarized in Table 1.

Comparative Example 3

Under a nitrogen atmosphere, a pressure resistant glass reaction vessel in which a magnetic stirrer was placed was charged with cyclopentene 100 parts, a monomer copolymerizing with cyclopentene, that is, 1,5,9-cyclododecatriene 15 parts, and allyl(trimethoxy)silane 0.12 part. Next, this was charged with (1,3-dimesitylimidazolidin-2-ylidene) (tricyclohexylphosphine)benzylidene ruthenium dichloride 0.0062 part dissolved in toluene 10 parts to perform a polymerization reaction at 0° C. for 10 hours. After the polymerization reaction, an excess of vinylethylether was added to stop the polymerization, then the obtained solution was poured into a large excess of isopropanol, whereupon the polymer precipitated. The precipitated polymer was recovered, was washed by isopropanol, then was vacuum dried at 40° C. for 3 days to thereby obtain a cyclopentene ring-opening (co)polymer which has alkoxysilyl groups (trimethoxysilyl groups) introduced by a metathesis reaction at the polymer chain terminal ends in 60 parts. The obtained polymer had a weight average molecular weight (Mw) of 297,000 and a molecular weight distribution (Mw/Mn) of 1.98 and had a cis/trans ratio of 17/83. Further, the rate of introduction of alkoxysilyl groups at the polymer chain terminal ends was 50%. Part of the obtained polymer was evaluated for affinity with inorganic particles. Furthermore, except that the obtained polymer was used as is for production of a sheet-shaped polymer composition similar to Example 1 (process after process of kneading with styrene butadiene rubber or polybutadiene rubber), the same procedure was followed as in Example 1 to obtain a sheet-shaped polymer composition and to evaluate this polymer composition for the low heat generation property. The results of measurement and evaluation in Comparative Example 3 are shown summarized in Table 1.

Comparative Example 4

Except for using, instead of allyltriethoxysilane 0.22 part, 1-hexene 0.090 part, the same procedure was followed as in Comparative Example 2 to obtain a cyclopentene ring-opening polymer not having functional groups at the polymer chain terminal ends in 68 parts. The obtained polymer had a weight average molecular weight (Mw) of 291,100 and a molecular weight distribution (Mw/Mn) of 2.15 and had a cis/trans ratio of 61/39. Part of the obtained polymer was evaluated for affinity with inorganic particles. Furthermore, except that the obtained polymer was used as is for production of a sheet-shaped polymer composition similar to Example 1 (process after process of kneading with styrene butadiene rubber or polybutadiene rubber), the same procedure was followed as in Example 1 to obtain a sheet-shaped polymer composition and to evaluate this polymer composition for the low heat generation property. The results of measurement and evaluation in Comparative Example 4 are shown summarized in Table 1.

Comparative Example 5

Part of the cyclopentene ring-opening polymer which has hydroxy groups at the polymer chain terminal ends which was obtained in Production Example 3 was evaluated for affinity with inorganic particles. Furthermore, Except that the polymer which was obtained at Production Example 3 was used as is, without introducing the specific terminal end structures to the polymer chain terminal ends, for production of a sheet-shaped polymer composition similar to Example 1 (process after process of kneading with styrene butadiene rubber or polybutadiene rubber), the same procedure was followed as in Example 1 to obtain a sheet-shaped polymer composition and to evaluate this polymer composition for the low heat generation property. The results of measurement and evaluation in Comparative Example 5 are shown summarized in Table 1.

As will be understood from Table 1, the cyclopentene ring-opening polymers of the present invention which have structures with polymer chains and groups including alkoxysilyl groups bonded through urethane bond groups at the polymer chain terminal ends (Examples 1 to 4), compared with a cyclopentene ring-opening polymer which does not have functional groups at the polymer chain terminal ends (Comparative Example 4), cyclopentene ring-opening polymers which have hydroxy groups at the polymer chain terminal ends (Comparative Examples 1 and 5), and cyclopentene ring-opening polymers which have alkoxysilyl groups introduced by a methathesis reaction at the polymer chain terminal ends (Comparative Examples 2 and 3), are superior in affinity with inorganic particles and give polymer compositions excellent in the low heat generation property. Therefore, the cyclopentene ring-opening polymers of the present invention can be said to be cyclopentene ring-opening polymers which are improved in affinity with inorganic particles and thereby can give polymer compositions which have an excellent low heat generation property compared with conventional cyclopentene ring-opening polymers.

The invention claimed is:
1. A cyclopentene ring-opening polymer which has structures at the polymer chain terminal ends where the polymer chains and groups including alkoxysilyl groups are bonded through urethane bond groups and which has a weight average molecular weight of 100,000 to 1,000,000,
  wherein the structures of polymer chains and groups including alkoxysilyl groups bonded through urethane bond groups are structures expressed by the general formula (1):

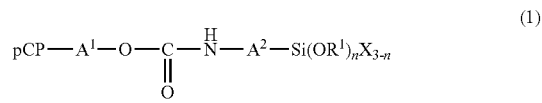

(in the general formula (1), pCP indicates a polymer chain of cyclopentene ring-opening polymer, and $A^1$ and $A^2$ respectively indicate a single bond or $C_1$ to $C_{20}$ bivalent hydrocarbon groups. $R^1$ indicates a $C_1$ to $C_{20}$ alkyl group, when there is a plurality of groups represented by $R^1$, these may be the same groups or may be different groups, X indicates a group selected from a hydrogen atom, $C_1$ to $C_{20}$ alkyl group, $C_6$ to $C_{20}$ aryl group, $C_6$ to $C_{20}$ allyloxy group, and a halogen atom, when there is a plurality of groups represented by X, these may be the same groups or may be different groups, n is an integer of 1 to 3).

2. The cyclopentene ring-opening polymer as set forth in claim 1, wherein the rate of introduction of the structures of polymer chains and groups including alkoxysilyl groups bonded through urethane bond groups to the polymer chain terminal ends, expressed as a value of the percentage of (number of cyclopentene ring-opening polymer chain terminal ends to which said structures of polymer chains and groups including alkoxysilyl groups bonded through urethane bond groups are introduced / total number of cyclopentene ring-opening polymer chain terminal ends), is 20% or more.

3. A method of production of the cyclopentene ring-opening polymer as set forth in claim 1, comprising steps of producing a cyclopentene ring-opening polymer which has hydroxy groups at the polymer chain terminal ends, then reacting the hydroxy groups of the cyclopentene ring-opening polymer and isocyanate groups of a compound which contains alkoxysilyl groups and isocyanate groups in its molecule.

4. The method of production of a cyclopentene ring-opening polymer as set forth in claim 3, wherein the cyclopentene ring-opening polymer which has hydroxy groups at the polymer chain terminal ends is produced by using a ring-opening polymerization catalyst which has resistance to hydroxy groups to polymerize cyclopentene by ring-opening polymerization in the presence of an olefin compound which has hydroxy groups.

5. The method of production of a cyclopentene ring-opening polymer as set forth in claim 3, wherein the cyclopentene ring-opening polymer which has hydroxy groups at the polymer chain terminal ends is produced by using a ring-opening polymerization catalyst which does not have resistance to hydroxy groups to polymerize cyclopentene by ring-opening polymerization in the presence of an olefin compound which has hydroxy groups which are protected by protective groups and removing the protection of the hydroxy groups which are protected by the protective groups which were introduced into the terminal ends of the obtained polymer.

6. The method of production of a cyclopentene ring-opening polymer as set forth in claim 3, wherein the compound containing alkoxysilyl groups and isocyanate groups in its molecule is a compound of the following general formula (3):

$$O=C=N-Y-Si(OR^4)_a(R^5)_{3-a} \quad (3)$$

(in the general formula (3), $R^4$ and $R^5$ indicate $C_1$ to $C_{20}$ hydrocarbon groups, and Y indicates $C_1$ to $C_{20}$ bivalent hydrocarbon groups, "a" is an integer of 1 to 3).

7. A polymer composition containing a cyclopentene ring-opening polymer as set forth in claim 1 and inorganic particles.

8. A cross-linked product obtained by cross-linking the polymer composition as set forth in claim 7.

9. A tire obtained by using the cross-linked product as set forth in claim 8.

* * * * *